United States Patent
Ducker et al.

(10) Patent No.: US 11,699,157 B1
(45) Date of Patent: Jul. 11, 2023

(54) DYNAMIC GENERATION OF DIGITAL MESSAGES WITH UNIQUE LINKS FOR DIRECT-TO-MERCHANT PAYMENTS

(71) Applicant: Chime Financial, Inc., San Francisco, CA (US)

(72) Inventors: Michael Ducker, San Francisco, CA (US); Baishi Wu, San Francisco, CA (US)

(73) Assignee: Chime Financial, Inc., San Francisco, CA (US)

( * ) Notice: Subject to any disclaimer, the term of this patent is extended or adjusted under 35 U.S.C. 154(b) by 226 days.

(21) Appl. No.: 17/038,760

(22) Filed: Sep. 30, 2020

(51) Int. Cl.
*G06Q 40/00* (2023.01)
*G06Q 20/40* (2012.01)
*G06N 20/00* (2019.01)

(52) U.S. Cl.
CPC ......... *G06Q 20/4016* (2013.01); *G06N 20/00* (2019.01); *G06Q 20/4014* (2013.01)

(58) Field of Classification Search
CPC . G06Q 20/4016; G06Q 20/4014; G06N 20/00
See application file for complete search history.

(56) References Cited

U.S. PATENT DOCUMENTS

| | | | | |
|---|---|---|---|---|
| 8,751,379 B1* | 6/2014 | Bueche, Jr. | ........ | G06Q 20/3255 705/40 |
| 11,055,692 B1* | 7/2021 | Bodalia | ............ | G06K 19/06037 |
| 11,062,291 B1* | 7/2021 | Brady | ................. | G06Q 20/223 |
| 2004/0111367 A1* | 6/2004 | Gallagher | .............. | G06Q 20/10 705/39 |
| 2010/0082466 A1* | 4/2010 | Carlson | ................ | G06Q 20/105 705/40 |
| 2010/0274678 A1* | 10/2010 | Rolf | ........................ | G06Q 20/20 705/17 |

(Continued)

FOREIGN PATENT DOCUMENTS

| WO | WO-02059847 A1 * | 8/2002 | ............. G06Q 20/02 |
|---|---|---|---|
| WO | WO-2006052203 A1 * | 5/2006 | ............. G06Q 20/02 |

OTHER PUBLICATIONS

Palaka et al., "A Novel Peer-to-Peer Payment System," The IEEE Region 8 EUROCON 2003 (Year: 2003).*

(Continued)

*Primary Examiner* — Abhishek Vyas
*Assistant Examiner* — William B. Bunker
(74) *Attorney, Agent, or Firm* — Keller Preece PLLC

(57) ABSTRACT

A payer initiates a payment transaction of a certain dollar amount through a user interface provided by their bank. The bank generates a hyperlink associated with the payment transaction. By managing a state of the transaction, the hyperlink can be given an expiration time and/or a counter of visits. The hyperlink is sent to a payment recipient in a text message or email, either by the payer or by the bank. Upon following the hyperlink, the recipient can enter their own debit card information to receive the money transfer to their debit account, without the need to set up an account login or account. A notification mechanism, such as a broadcast stream of payments, can be employed to inform different entities (such as those recording property payments or utilities payments) that a payment was made to the payment recipient.

20 Claims, 5 Drawing Sheets

(56) References Cited

U.S. PATENT DOCUMENTS

| | | | | |
|---|---|---|---|---|
| 2014/0310171 | A1* | 10/2014 | Grossman | G06Q 20/384 |
| | | | | 705/44 |
| 2016/0071069 | A1* | 3/2016 | Skala | G06Q 20/0425 |
| | | | | 705/32 |
| 2017/0046680 | A1* | 2/2017 | Crites | G06Q 20/223 |
| 2017/0255911 | A1* | 9/2017 | Kassemi | G06Q 20/384 |
| 2018/0075501 | A1* | 3/2018 | Ahmed | G06Q 20/384 |
| 2018/0197167 | A1* | 7/2018 | Ganesan | G06Q 20/4016 |
| 2018/0336542 | A1* | 11/2018 | Wilson | G06Q 20/10 |
| 2021/0012329 | A1* | 1/2021 | Gandhi | G06Q 20/405 |
| 2022/0383325 | A1* | 12/2022 | Hoffman | G06Q 20/204 |

OTHER PUBLICATIONS

Anonymous, "Method for Secure Peer-to-Peer File Sharing with Payment," IPCOM000061729D, 2005 (Year: 2005).*

* cited by examiner

DYNAMIC GENERATION OF DIGITAL MESSAGES WITH UNIQUE LINKS FOR DIRECT-TO-MERCHANT PAYMENTS

BACKGROUND

Consumers are increasingly offered an option for paperless billing and payments, that is, an option to pay bills through managed digital platforms. In a typical implementation, to facilitate the digital transfer of money a customer (payer) must create an account on a third party payment system and enter their payment information. The third party system acts as a middle man that facilitates a payment to a recipient (the intended payee). As one example, a tenant intending to pay their rent electronically must create an account with a property management company and pay the property management company via their third party software. The landlord, having their own account with the property management company, receives the money in due course. In another implementation, a payer uses their bank's website or application to instruct that their bank issue a check to the intended payee, who must then independently take that check and deposit it in a conventional manner.

Additional solutions that facilitate direct digital payments between source and target entities while maintaining security and convenience of transactions are generally desired.

BRIEF DESCRIPTION OF THE DRAWINGS

The disclosed embodiments have other advantages and features that will be more readily apparent from the detailed description, the appended claims, and the accompanying figures (or drawings). The disclosure can be better understood with reference to the following drawings. The elements of the drawings are not necessarily to scale relative to each other, emphasis instead being placed upon clearly illustrating the principles of the disclosure.

Figure 1:
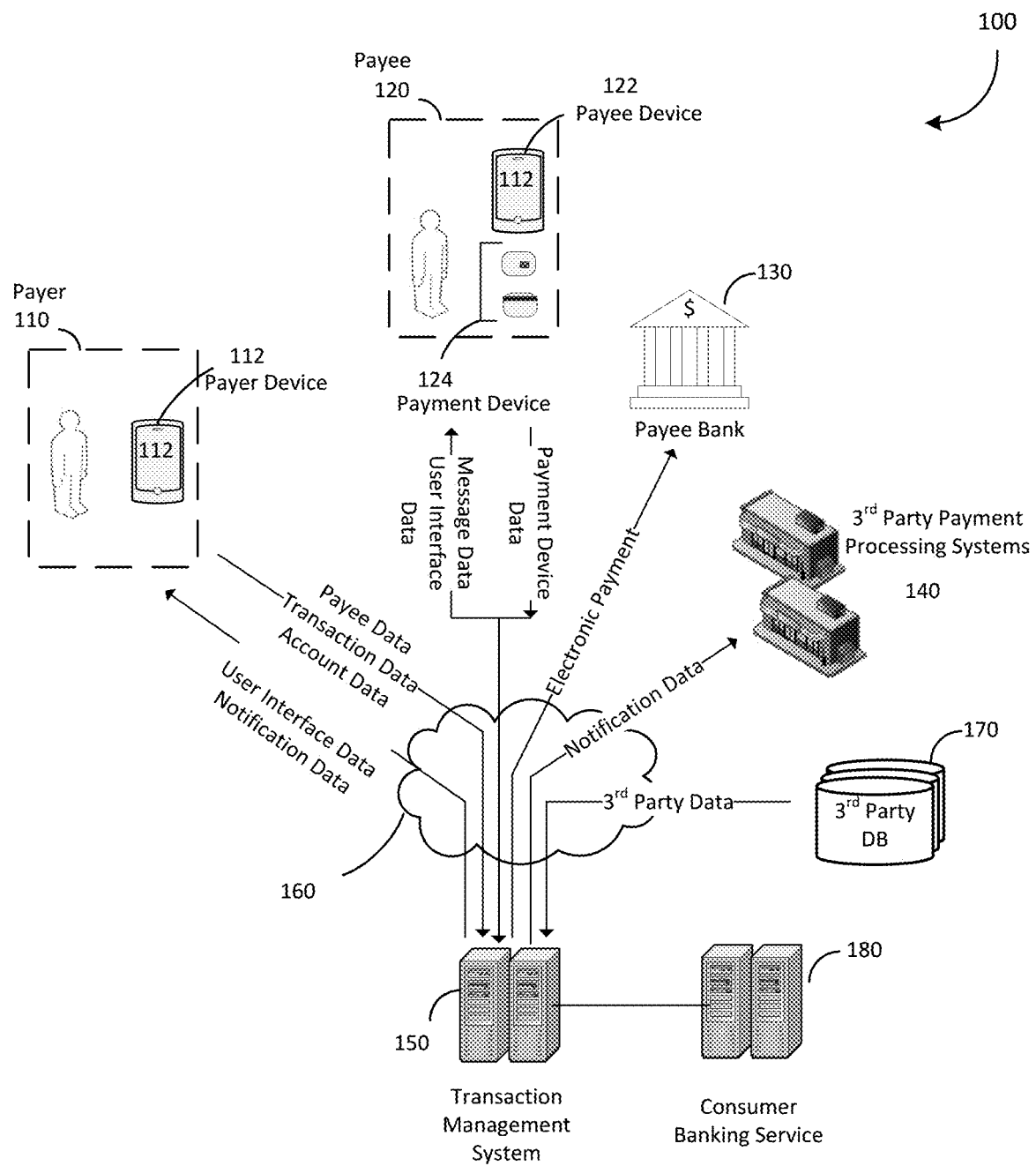
FIG. 1 is a diagram illustrating an environment including a transaction management system for facilitating payment transactions between a payer and a payee in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The present disclosure generally relates to facilitating digital payments from end-to-end, and more particularly to systems and methods for dynamic generation of messages with unique links to user interfaces for receiving transferred money. In an exemplary embodiment, a customer of a financial institution (also referred to herein as a payer or payor) can transfer money directly to an intended recipient (also referred to herein as a payee) via a hyperlink uniquely associated with the payment transaction. In one example, a payer initiates a payment of a certain value with a certain intended payee. Funds sufficient to cover that value are removed from one or more of the payer's accounts and are maintained in a holding account. A transaction management system generates a hyperlink on an ad hoc basis, and stores that hyperlink in a database. The generated hyperlink is sent to the payee in an email, text message, or other appropriate type of private digital communication. Upon following the link, the payee is presented with a user interface to enter their own debit card (or other account) information, upon which entry the money will be transferred from the holding account to the provided payee account. In the exemplary embodiment, no signup, login/password, biometric, third-party application, or other user-entered authentication is required by the payee, and no entry of account information is strictly required by the payer. In some embodiments, a know your client (KYC) check and/or other forms of security/risk checks may be performed prior to transferring money to the payee.

In some embodiments, the state of the generated hyperlink can be managed to restrict access to the payment. For instance, the hyperlink may be associated with a certain period and/or time limit for access. In other embodiments, the hyperlink may additionally or alternatively be restricted to a certain visit count, by IP address or geographic area, or the like.

In some embodiments, the transaction management system uses its knowledge that a payment was made to instruct the update of the records of other interested entities, without either party to the payment needing to take further action. For instance, there may be an integration with one or more online payment systems (e.g., a property management system) where the transmission of the payment to the recipient triggers an instruction/notification to the online payment system to record the payment to the customer's account. Rather than a pre-configured payment processing system saved in association with the customer account, the system can continuously broadcast out a public stream of payment transaction data regarding payments made through the mechanism described above and herein, and third-party payment system managers can recognize a particular payment from the broadcast as being relevant to their system. That is, the transaction management system could use webhooks to send data (notification of payment) to a plurality of third-party payment systems, where not all the data will be relevant to each third-party system. The third-party system's receipt and processing of this data may be as simple as updating a ledger of the customer's and/or recipient's account.

In conventional solutions, a customer (payer) and the recipient (payee) both have accounts with a third-party payment system, each requiring a prerequisite sign up process. Further, most payers have a variety of bills to pay with multiple discrete service or product providers, such as rent, individual utilities, subscription services, mortgages, loan repayments, insurance, among many others, potentially requiring sign-up to several completely distinct payment processing systems. Payers may find it burdensome or time consuming to establish and maintain a plurality of accounts. Payees may be subject to various subscription costs or surcharges for use of the third-party systems. Further, setting up these accounts may require the payer and/or the payee to disclose information that they may not want to provide (such as detailed bank account information), over one or multiple third party systems with varying degrees of security.

In contrast to these conventional solutions, the systems and methods described herein empower end users to manage their own digital payments while maintaining security and traceability between payer and payee. Specifically, user interfaces are created and transmitted that provide new mechanisms for people to send and receive money. Because these mechanisms are implemented through already-adopted and relatively universal platforms, such as email and text messaging, payees can receive money without having to download or rely upon third party systems. The systems and methods described herein further mitigate delays in payment transmission that may occur when transmitting money through a middleman, allowing for faster end-to-end payment processing, and removing the requirement for a payer and payee to subscribe to the same third-party service. Still further, the user interfaces described herein may be streamlined to reduce bandwidth and storage requirements otherwise imposed by third party websites and applications. Additionally, the systems and methods described herein can be used in parallel with third party payment processing systems, transmitting notifications of payment so that the payer's/payee's digital payment records can be synchronized across multiple systems. Accordingly, the convenience, speed, security, and accessibility of the computer systems handling digital payment processing and the user interfaces presented to the end users are improved.

FIG. 1 depicts, in accordance with some embodiments of the present disclosure, an environment 100 including a transaction management system 150 for facilitating payment transactions between a payer 110 and a payee 120. As illustrated, environment 100 may include one or more payers 110 (also variously referred to herein as users of a payer device 112, customers, clients, or consumers) who may open an account (e.g., checking or savings account or other banking account) with the owner of a transaction management system 150. In an exemplary embodiment, the entity that owns or manages the transaction management system 150 is a financial entity, such as a consumer banking service 180 for managing the payer's financial account. The consumer banking service 180 may also manage one or more user-facing systems. Payer 110 may, via a dedicated application (app) or website accessed on their mobile device 112 (described in greater detail below with reference to FIG. 2), be a user of such a user-facing system, such that payer 110 can interact with the consumer banking service 180 and transaction management system 150, for example to check or manage account status, make deposits or withdrawals, and the like. The payer 110 may be capable of initiating one or more payment transactions associated with the payer's bank account, or, in some embodiments, more than one bank account, using their device 112.

As illustrated, the environment 100 may also include one or more payees 120 (also variously referred to herein as users of a payee device 122, recipients (of a payment), or merchants/service providers) who need not be a customer of (or otherwise affiliated with) the consumer banking system 180, but who can, via a device 122, access one or more user interfaces provided by transaction management system 150. A payee 120 may have their own account with a banking entity. In some embodiments, the payee's account is associated with a payment device 124. In an exemplary embodiment, payment device 124 is debit card, however it may be any of, for example, a payment card having a magnetic strip that is swiped in a magnetic reader of a payment reader, a payment device having a Europay/MasterCardNisa (EMV) chip that is inserted into a corresponding EMV slot of a payment reader (e.g., a secured charge card, credit or debit card, a gift card, a proxy card, etc.), and near field communication (NFC) enabled devices such as a smart phone or EMV card that is tapped at a payment reader and that transmits payment information over a secure wireless connection, or an electronic or virtual account. A payee 120 may be any individual, group, or other entity that the payer 110 wishes to transfer money to for any reason. For example, a payee might be a merchant or service provider that is owed a payment of a particular value from payer 110. The term "money" is used herein simply for convenience, and any asset associated with a value denomination, e.g., cryptocurrency, may apply and be applicable in other embodiments. The term "merchant" may be understood to encompass any business or other entity that sells, leases, or otherwise provides or provided goods or services to payer 110 as part of a financial transaction, an ATM or other device/system with a cash-back function, a bill pay system (e.g., system for sending checks, wires), an automated clearing house (ACH), a party to one or more peer-to-peer payments, or any other entity or representative party or object engaging in a payment transaction with the payer 110. Examples of merchants may be landlords, utility companies, cable companies, banks or other entities from which the payer has taken a loan or mortgage, a subscription service, an online or physical vendor or service provider, an individual known or unknown to the payer 110, or any appropriate party.

Payee bank 130 may include any number of computing servers that manage the payment networks on which the payment device 124 works. The payee bank 130 may receive (and in some embodiments transmit) information or instructions regarding payer 110's payment transactions from transaction management system 150 and/or the consumer banking service 180. For instance, transaction management system 150 may transmit an electronic payment through an automated clearing house (ACH) network from the payer's account(s) with consumer banking service 180 to the payee's account with payee bank 130.

Third party databases 170 may include one or more databases variously storing information regarding the payer 110 and/or the payer 120, and/or their accounts or payment devices. In some embodiments, transaction management system 150 may request information stored at one or more of third party databases 170 to facilitate or assist in a know your client (KYC) check regarding a payment to be transferred, perform a risk analysis of the payee or transaction, the payer 120, and/or the payer device 122, or perform other analytical actions. Third party databases 170 may contain publicly accessible and/or private information (where transaction management system 150 has authorization to access such information), or may contain information owned or managed by transaction management system 150 that is being stored or hosted on a third party-managed server.

The components of environment 100 may communicate with each other over a communication network 160. Network 160 may comprise one or more network types, such as a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network, or any combination thereof. Although communication network 160 may be any suitable communication network, in one embodiment, communication network 160 is the Internet and payment and transaction information may be communicated in an encrypted format such by a transport layer security (TLS) or secure socket layer (SSL) protocol. In addition, when the network 160 is the Internet, any of the components of environment 100 may use the transmission control protocol/Internet protocol (TCP/IP) for communication.

It will be understood that while, for ease of illustration, FIG. 1 depicts one payer 110, one payee 120, one payment device 124, one payer device 112, one payee device 122, one merchant bank 130, one transaction management system 150, one consumer banking service 180, and a plurality of third party databases 170, environment 100 is not limited to that configuration. In various implementations, any number of payers, payees, banks, services, or devices may be used in any number of configurations. Further, while FIG. 1 illustrates a card or NFC based payment device used by payee 120, other embodiments may exist where any device or information associated with a financial account may be used in any transaction involving the deduction of funds from that financial account.

In an exemplary embodiment, each of payer device 112 and/or payee device 122 may be, for instance, a respective mobile telephone or smartphone such as an iPhone or Android device, an iPad or tablet device, a laptop or touchscreen device, a PC or stationary computing device, a web appliance, a network router, switch or bridge, or any other practical machine that can communicate via a communication network 160 and is capable of executing instructions (sequential or otherwise) that specify actions to be taken by that device. Payer 110 can use their device 112 (and payee 120 may use device 122) to access, view, input data, and/or take action in response to delivered content. In an exemplary embodiment, the devices 112, 122 present information to a user via a display on or connected to the devices 112, 122, and take input from the user in relation thereto (for example, through interactive graphics or hyperlinks) via a touchscreen, mouse, keyboard, stylus, or any other appropriate input device. For example, devices 112, 122 may be capable of receiving and displaying notification data via a dedicated application (app) or website, email, text or instant messaging, voice, SMS, QR code, voicemail, or any other appropriate type of communication.

For ease of reference, the component parts and functions of payer device 112 are described below and herein (e.g., with reference to FIG. 2) and payee device 122 may be understood to contain the same (or similar) components and to be configured to perform the same (or similar) functions as device 112. Component parts of a device 122 may be referred to herein by the numerical values of analogous components of device 112. Some exemplary differences of note between payer device 112 and payee device 122 may be described below, however even where no differences are specifically described, the devices 112 and 122 need not be identical to each other in form or function.

Figure 2:
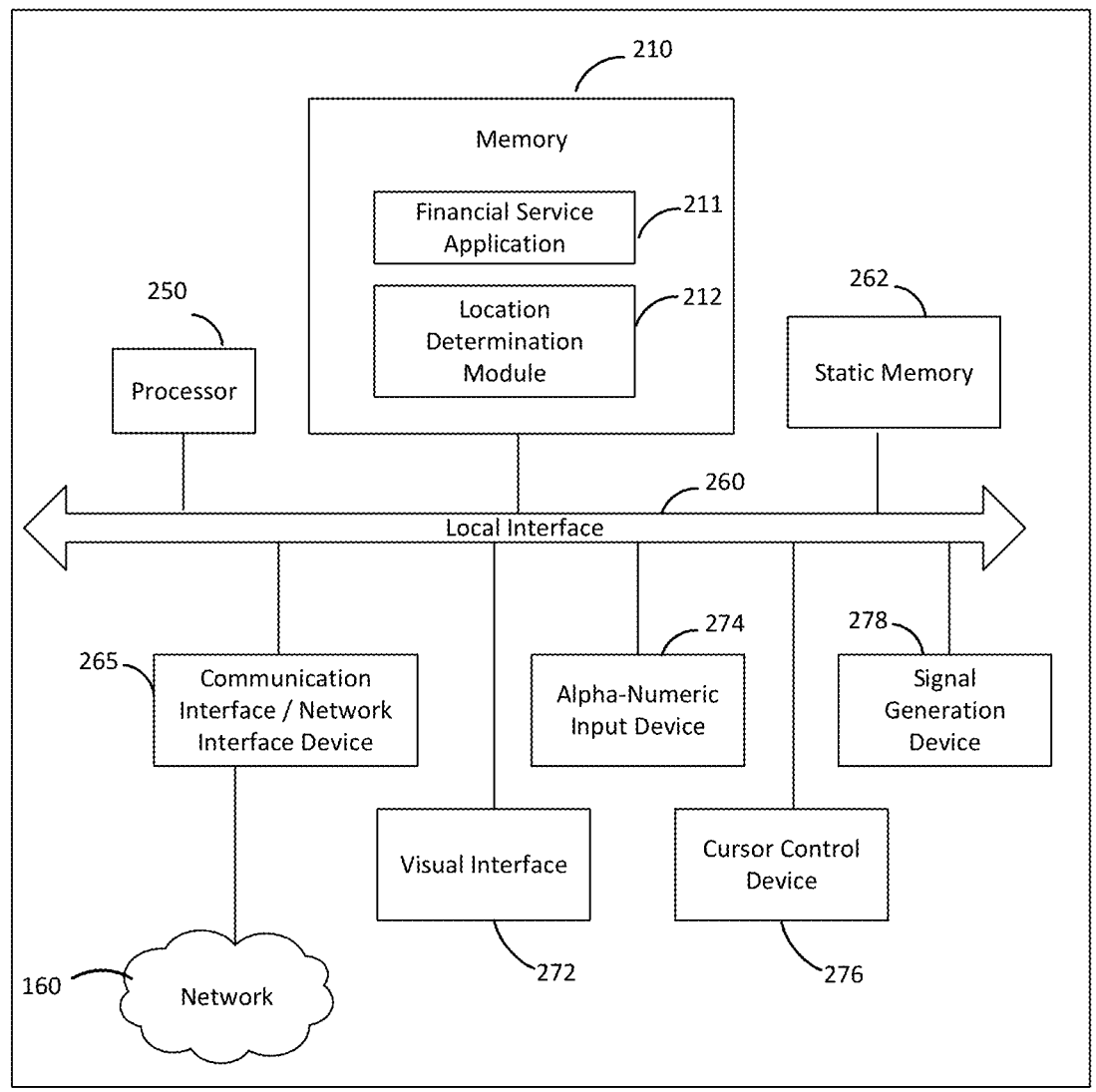
FIG. 2 is a block diagram illustrating component parts of a payer device in accordance with some embodiments of the present disclosure.

FIG. 2 illustrates exemplary components of a payer device 112, though the device is not limited thereto. The payer device 112 may display a user interface through which a user may interface with transaction management system 150 via communications over network 160. The user interface may be displayed on device 112 through, for instance, one or more of a web browser, application, text message/alert, device-standard notification, or by any other technique that allows for the display of server-generated content on an electronic display or visual interface 272 of the device 112. This may be a screen, such as an LED screen, OLED screen, LCD screen, plasma screen, and/or touchscreen (e.g., capacitive or resistive touch display). The visual interface 272 may display user interfaces directly (e.g., on the screen) or indirectly on a surface, window, or the like (e.g., via a visual projection unit). The user interfaces may also allow for input of information via that screen and/or another input device (touch-sensitive components, keyboard, keypad, mouse, trackpad, text, voice call, passbook, wearable or peripheral devices, or any known technique, whether implemented as software or hardware or any combination thereof. Device 112 may in some embodiments include alphanumeric input device 274 (e.g., a keyboard or touch screen keyboard), a cursor control device 276 (e.g., a mouse, a trackball, a joystick, a motion sensor, or other pointing instrument), a signal generation device 278 (e.g., a speaker), a microphone, and/or a static memory 262, which components also are configured to communicate via local interface 260, which may include, for example, at least one bus.

Payer device 112 may include a memory 210. As used herein, memory 210 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor 250. The illustrated embodiment depicts a number of modules or applications stored in memory 210. These depicted modules may variously represent one or more algorithms, computational models, decision making rules or instructions, or the like implemented as software code or computer-executable instructions (i.e., routines, programs, objects, components, data structures, etc.) that, when executed by one or more processors 260, program the processor(s) to perform the particular functions of their respective logic. These modules are depicted in FIG. 2 as several discrete components, each labelled as an individual "logic", however, in various embodiments, the functions of each respective logic may be executable on their own or as part of one or more other modules; that is, any configuration of the depicted logical components may be used, whether implemented by hardware, software, firmware, or any combination thereof.

In some embodiments, memory 210 may store a financial service application 211, which may be a software application (app) managed by transaction management system 150 or consumer banking service 180 to display and intake information from the user of the device. In some embodiments, memory 210 may store a location determination module 212 (which may be part of financial service app 211) configured to determine a user's location. In such an embodiment, payer device 112 may additionally include a location-determination device, such as a device transmitting a beacon or signal, a GPS receiver, or another type of device that may be used by location determination module 212 to determine a current location of the customer device. In some embodiments, payer device 112 and/or payee device 122 need not contain either or both of the financial service application module 211 and/or the location determination module 212, and instead may use one or more other modules (e.g., a browser, text messaging application, mail application, or the like) to view and input information as described in greater detail herein.

Figure 3:
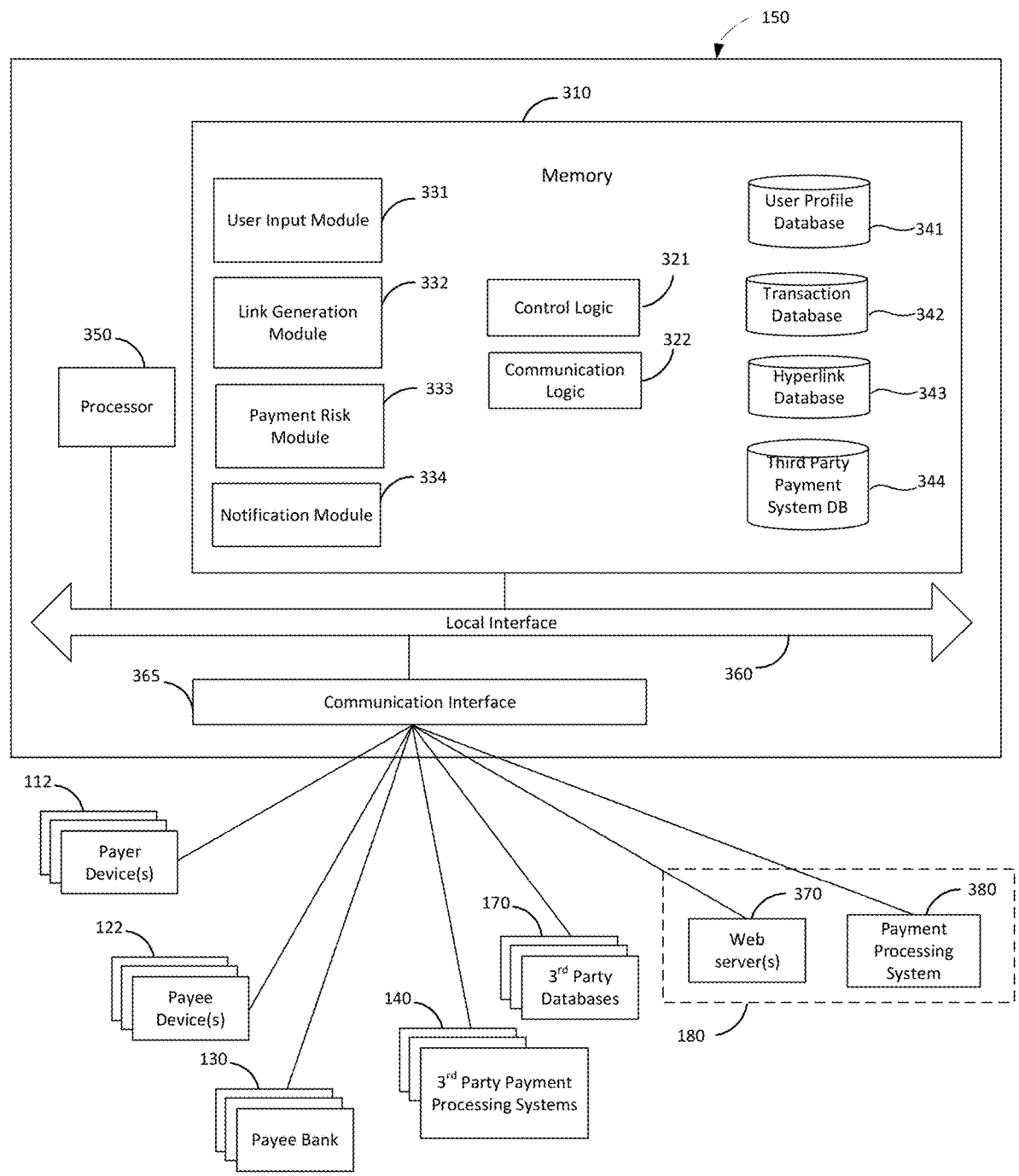
FIG. 3 is a block diagram illustrating component parts of a transaction management system in accordance with some embodiments of the present disclosure.

FIG. 3 depicts an example schematic diagram of certain components of a transaction management system 150. FIG. 3 shows a diagrammatic representation of components of a machine such as a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that machine. While only a single machine is illustrated, the term "machine" shall also be taken to include any collection of machines that individually or jointly execute instructions to perform any one or more of the methodologies discussed herein.

The transaction management system 150 may include a memory 310. As used herein, memory 310 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor (e.g., processor 350). Memory 310 may also be understood as a machine-readable medium on which is stored instructions (e.g., software) embodying any one or more of the methodologies or functions described herein. While FIG. 3 illustrates a single discrete memory 310, it will be understood that the embodiments described herein are not limited to any particular arrangement and that other embodiments may store information in one combined memory, or with information stored in a different configuration in one or more memories, some local to the other components illustrated in FIG. 3 and/or some shared with, or geographically located near, other remote computing systems.

As illustrated, a number of modules are stored in memory 310, specifically, user input module 331, link generation module 332, payment risk module 333, notification module 334, control logic 321, and communication logic 322. These depicted modules may variously represent one or more algorithms, computational models, decision making rules or instructions, or the like implemented as software code or computer-executable instructions (i.e., routines, programs, objects, components, data structures, etc.) that, when executed by one or more processors 350, program the processor(s) to perform the particular functions of their respective logic. These modules are depicted in FIG. 3 as several discrete components, each labelled as an individual "module" or "logic", however, in various embodiments, the functions of each respective logic may be executable on their own or as part of one or more other modules; that is, any configuration of the depicted logical components may be used, whether implemented by hardware, software, firmware, or any combination thereof. Further, the modules need not necessary be part of transaction management system 150 and may instead by distributed over one or more computing systems. The capabilities of these various logics are described in greater detail below.

The transaction management system 150 may include control logic 321, including one or more algorithms or models for generally controlling the operation of the transaction management system 150. The memory 310 may also, in one embodiment, include communication logic 322, including one or more algorithms or models for obtaining information from or communicating information via network 160 (FIG. 1). The transaction management system 150 may, via communication interface 365, operate to exchange data with various components, systems, and/or devices on the network 160 or any other network. For instance, communication interface 365 and communication logic 322 may be used (by, e.g., any of modules 331-334) to access data from or send data to any of one or more payer devices 112, payee devices 122, payee bank 130, one or more external or third party processing systems 140, one or more external or third-party databases 170, one or more web servers 370, and/or one or more payment processing systems 380. In some embodiments, communication logic 322 may use APIs provided by these entities or webhooks established between the transaction management system 150 and/or one or more third party payment processing systems 140 (or other entities) to obtain their respectively stored data or transmit data or instructions to their systems. However, other methods of data collection/transmission may alternatively be used such as one or more software development kits, which may include, e.g., one or more application programming interfaces (APIs), web APIs, tools to communicate with embedded systems, or any other appropriate implementation.

In the embodiment of FIG. 3, one or both of web server 370 and payment processing system 380 may be owned or managed by a single entity, such as consumer banking service 180. In some embodiments, consumer banking service 180 may also own or manage transaction management system 150, such that payment processing system 380 can be used to move, deduct, and/or process funds from an account at consumer banking service 180 associated with the payer 110, based on decisions made and instructions issued by transaction management system 150. Information or notifications regarding the transaction(s), and/or the processing of various account(s) may be displayed to the payer 110 or payee 120 via one or more user interfaces respectively transmitted to payer device 112 or payee device 122 via web server 370. In an exemplary embodiment, web server 370 can deliver, to payer device 112, one or more of various user interferences that provides the payer with the ability to perform one or more banking-related functions, which may include any or all of: making payments from one or more of payer's accounts with consumer banking service 180, enrolling in one or more financial accounts, inputting account settings, management of financial accounts (e.g., checking/savings accounts), viewing of account statements or metrics, receiving financial alerts/notifications, making deposits/withdrawals, direct deposit, bill pay, money transfer, check deposit, and/or any other relevant activities. In an exemplary embodiment, web server 370 can deliver, to payee device 122, one or more of various user interferences that provide the payee with the ability to enter bank account information (e.g., debit card information) that can be used by system 150 to transfer a monetary value based on a payment instructed by payer 110. In some embodiments, the data presented to the payer device 112 may be generated based on data stored in user profile database 341 and/or transaction database 342, and the data presented to the payee device 122 may be generated based on data stored in the transaction database 342 and/or hyperlink database 343, however, in other embodiments, such data may be collected from one or more databases on system 150 or an external system.

While communication logic 322 is illustrated as being a discrete logical component, in an alternative embodiment, the transaction management system 150 may include communication logic 322 as part of any of modules 331-334 or control logic 321. In another alternative embodiment, the communication logic 322 may communicate with third-party systems and/or may coordinate with the control logic 321 to read or write data to memory 310 or to another data repository (not shown) within the transaction management system 150.

The logics of the exemplary transaction management system 150 depicted in FIG. 3 may be executed by one or more processors 350, which may include any of (or any combination of) a central processing unit (CPU), graphics processing unit (GPU), digital signal processor (DSP), application specific integrated circuits (ASICs), radio-frequency integrated circuits (RFICs), other specialized processor or combination of processors, or other circuitry that communicates to and drives the other elements within the transaction management system 150 via a local interface 360, which can include at least one bus. While FIG. 3 illustrates one processor 350 that implements all of the various logics and modules in the transaction management system 150, it is possible in other embodiments for the system 150 to employ multiple processors. In one such alternate embodiment, discrete processing elements may be used for each of (or any subset of) modules 331-334, control logic 321, and communication logic 322, or any portions or subsets of those logics. In some embodiments, the processing of system 150 is not limited to being performed by a processing element connected to the local interface 360, but instead, any portion of processing in support of the various logics may be distributed over one or more computer systems that may be remotely located. In some embodiments, transaction management system 150 may be implemented in whole or in part as a machine learning system (e.g., neural network software) for achieving the functionalities described herein. In one embodiment, one or more of modules 331-334 (or any subset of any of those logics) may be implemented at least in part as one or more machine learning algorithms.

Memory 310 may be configured, in some embodiments, to include various databases. While the term "database" or "repository" is used with reference to elements 341, 342, 343, 344, and 170 these components are not so limited nor is any particular form or configuration of data storage mandated, and the described "databases" may alternatively be one or more of an indexed table, a keyed mapping, or any other appropriate data structure, or any combination thereof.

Memory 310 may be configured, in some embodiments, to include a user profile database 341 that stores account information related to one or more consumer accounts with a single financial entity (e.g., a consumer banking service 180) that owns or manages system 150, or accounts with other financial entities linked to such consumer accounts. An account may generally be understood to be associated with a payer 110, however the association need not be 1:1, such that an account may have multiple owners (joint account) or a payer 110 may have multiple accounts of any of various types (e.g., checking, savings, certificates of deposit, money market accounts, individual retirement accounts, and the like). In an exemplary embodiment, the accounts are those from which money can be easily transferred, that is, traditional checking and savings accounts, though they are not limited thereto. In some embodiments, user profile database 341 may include one or more tables, each entry in the table(s) corresponding to a unique set of account information or a unique user. In some embodiments, user profile database 341 may include information about a payer and/or a related or associated account, such as a unique account ID, an associated user ID (or customer ID), a current account balance, information regarding pending deposit/withdraw activity if such information exists (e.g., whether money is currently being held in any holding accounts and the associated information), user name, contact information (e.g., email address, mailing address, telephone number, etc.), date of birth, payment card information (e.g., payment card number, expiration date, cardholder name, security code) for each of any number of associated payment cards, customer account settings and/or preferences, and the like.

User profile database 341 may also include real-time and/or historic information relating to any of: customer account creation/removal/edits, deposit/withdrawal activity (e.g., dates of activity, amount of deposit/withdrawal) on customer accounts, activity by any users that may have shared or joint accounts with the customer, customer financial health metrics or scores, purchases made or pending using cards tied to any of the customer's accounts, customer activity on one or more user interfaces delivered by web server 370, and/or metrics generated on any of the above such information, whether based on an individual account or user, or in aggregate. In some embodiments, as various users login, make edits, changes, view, search, click, interact with, or otherwise engage in activities with the user interface on system 150, such activity may be stored in database 341 as indicators that may be considered, individually or in aggregate, in an analysis of payer 110's activity. In some embodiments, this information may be understood as user engagement metrics or behavioral biometrics.

Memory 310 may also store a transaction database 342 that contains information regarding individual payment transactions initiated by users identified in user profile database 341, whether pending or completed. Transaction database 342 may, in some embodiments, store information detailing every transaction made or requested in connection with a user's account(s), stored in association with a unique transaction ID and information sufficient to uniquely identify the associated user ID in database 341 (and/or their relevant financial account information). The data in database 342 may include any of approved transactions, rejected transactions, withdrawn transactions, pending transactions, refunded transactions, and the like, along with account balances resulting from such transactions. Transaction database 342 may also store, in association with a transaction, information sufficient to identify any payment recipients or entities that have transferred money into the payer's accounts. In some embodiments, a payment recipient may be identified by a name or address information, or account information, for example where the user has previously made payments to the payee recipient or has saved the recipient's information in system 150 (via financial service application 211, web browser, or other interface). In an exemplary embodiment, database 342 contains, in association with each stored transaction, contact information for the payment recipient such as an email address or phone number, or other appropriate contact information by which transaction management system 150 can transmit one or more digital messages to the recipient. In some embodiments, a transaction may be stored in association with one or more values related to a state of the transaction, such as whether it is active or expired, whether it has been approved or denied, whether it is pending, an expiration date/time, or the like.

Memory 310 may also store a hyperlink database 343, containing at least one hyperlink value stored in association with information sufficient to uniquely identify a transaction ID stored in transaction database 342. In an exemplary embodiment, a hyperlink is unique to a transaction, that is they are stored in a 1:1 relationship. In some embodiments, a hyperlink may be stored in association with one or more values related to a state of the hyperlink, e.g., a count number of access attempts (wherein access may be restricted if the count exceeds a certain value, or drops to zero, in embodiments where the count is added to or subtracted from upon an access attempt, respectively), an access date/time, etc. In some embodiments, a hyperlink may be stored in association with an expiration date/time or timeout value, indicating that the hyperlink is only accessible for a finite period of time. In some embodiments, a hyperlink may be stored in association with one or more rules that, when implemented, restrict or exclude access to the URL specified by the hyperlink based on e.g., IP address, device ID (MAC address), geographic region, whether the visitor is using a VPN, and/or other factors as appropriate. In some embodiments, the state of the hyperlink may indicate or be associated with the state of the transaction (e.g., if the hyperlink has/has not expired, the transaction has/has not expired), or vice versa.

Memory 310 may also store a third-party payment system 344 that stores information related to one or more third party payment systems, such as property management systems, utility management systems, and the like. In an exemplary embodiment, the transaction management system 150 may automatically transmit notification messages to one or more systems in third-party payment system 344 when payment transactions are completed and processed between a payer 110 and a payee 120. In an exemplary embodiment, this is done through a broadcast message to all the systems in database 344 or a public broadcast. In other embodiments, payment systems in database 344 may be stored in association with a category (e.g., property management) or other qualifier (e.g., location (city/state)). In such a case, transaction management system 150 may only transmit messages to a subset of systems in database 344, for example, those belonging to a certain category or sharing a certain qualifier.

In an exemplary embodiment, system 150 may update information in databases 341 and/or 342 based on data collected from web server 370. In the embodiment of FIG. 3, web server 370 is remote from system 150 and therefore such information is collected via communication logic 322. In other embodiments, web server 370 may be local to, or integral with, system 150 and such data may be accessed over local interface 360. Web server 370 may transmit information to and receive data from user device 112.

In an alternate embodiment, databases 341, 342, 343, and 344 are not stored in transaction management system 150 itself, but are remotely stored in a shared memory (not specifically shown) so as to be accessible via one or more communication networks, such as network(s) 160. In some embodiments, the databases 341, 342, 343, and 344 may be accessible over the Internet and payment and other information may be communicated between system components in an encrypted format such by a transport layer security (TLS) or secure socket layer (SSL) protocol. In such an embodiment, both transaction management system 150 and payment processing system 380 are owned or managed by consumer banking service 180, and both systems 150 and 380 may access shared data. By these means, as either of systems 150 or 380 updates data in databases 341, 342, 343, and 344, the updated information is available to the other system.

Figure 4:
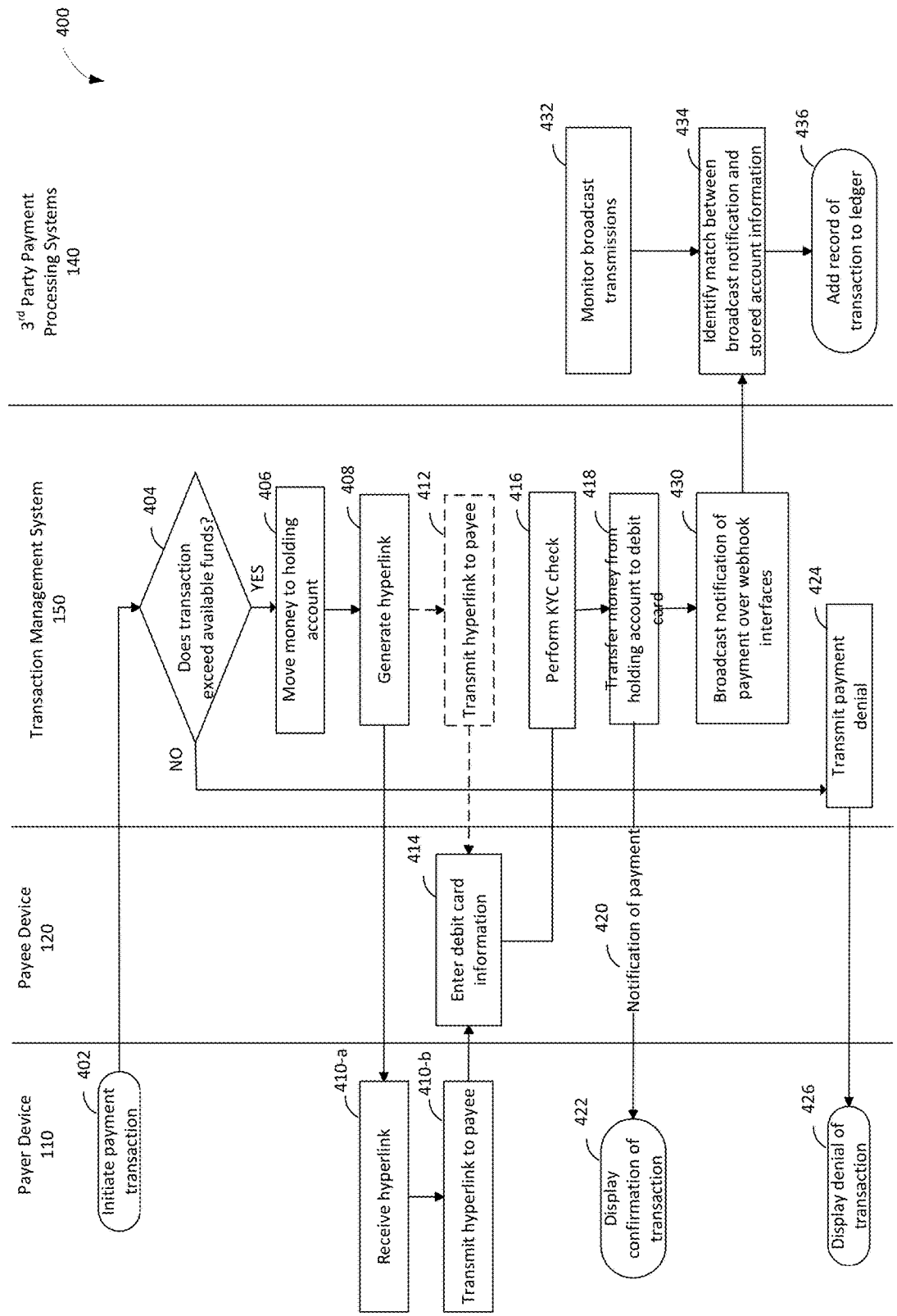
FIG. 4 is a flow chart of an exemplary transaction management process in accordance with some embodiments of the present disclosure.

FIG. 4 illustrates an exemplary process 400 by which transaction management system 150 may dynamically generate and transfer messages with unique links to user interfaces for receiving transferred money. In step 402, user input module 331 receives a transmission from financial service application 211 (or another component of payer device 112). This transmission contains data collected from payer 110 via a user interface displayed on payer device 112, the data including at least information sufficient to identify a payee and a payment amount. User input module 331 is configured to store, in user profile database 341 and transaction database 342, data associated with this initiated transaction.

In an exemplary embodiment, transaction management system 150 transmits, to financial service application 211, a user interface through which the payer can transfer money. This UI may be displayed to the payer through a dedicated app or browser on device 112, or through any interface through which information can be input via text, touch, or voice input, or any other input mechanism, and transmitted to the system 150. In some embodiments, financial service application 211 may interface with one or more other operating system or third party applications to facilitate user input (e.g., personal assistant apps, accessibility apps, or the like).

Figure 5:
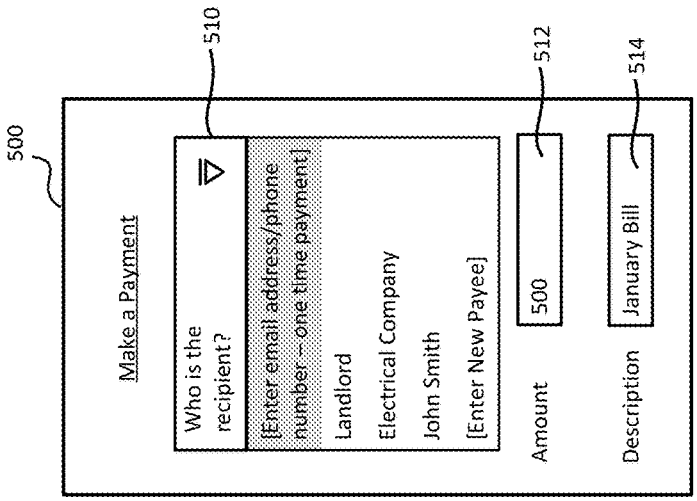
FIG. 5 illustrates an exemplary user interface for a user to input instructions to facilitate a payment, in accordance with some embodiments of the present disclosure.

FIG. 5 illustrates an exemplary user interface 500 displayed by financial service application 211 on the payer device 112 that may be used to facilitate a user's input of their payment information. User interface 500 includes payee selection element 510, a user interface element capable of taking in a value associated with an intended recipient of a money transfer. While element 510 is depicted as a drop-down menu, other embodiments may implement element 510 as a text field, a predictive text field, an audio input field, or the like. In FIG. 5, the value illustrated in element 510 as being selected is a "one time payment," upon the selection of which the payer would be prompted to enter contact information for the payee, such as an email address or phone number (to which an SMS or text message may be sent). Other illustrated values include a variety of previously stored/saved payees (previously stored by the payer 110), such as landlord, electrical or utility company, an individual (here "John Smith"), or a field to enter and save a new payee. These saved values may be preferred in embodiments where a payer makes multiple or recurring payments to the same payees, and wishes to store their contact information to avoid duplicated effort (or the possibility of mistake/error) in reentering payee information. FIG. 5 also illustrates a field 512 through which the payer can enter an amount to be paid.

In some embodiments, the UI 500 need not require that the user specifies any payee information, that is, the payer may simple initiate a generic transaction for a certain value specified in field 512, and may leave field 510 empty (or field 510 may not be displayed to the payer at all). Such an embodiment may be useful when the payer intends to communicate with the payee directly to transmit to them a payment link (described below).

Some embodiments may also include a field 514 in which the user can input a "description" to provide context for the payment. In some embodiments, this may be a freeform character string, and in other embodiments, it may be a selected value, e.g., from a variety of pre-set categories. Still other embodiments may contain a field (not shown) allowing the payer 110 to specify or select a financial account (associated with the payee in database 341) from which the payer intends the money for the transaction to be withdrawn or debited. In some embodiments, the UI 500 may also contain a field allowing the payer 110 to specify a third-party account number (e.g., a service account number) or other identifier (address, ID number, etc.). For instance, in a case that the payer is paying their electrical bill, the payer may be assigned an account number with their electrical company, and may enter the same for the payment transaction to be associated with that account, so that the payment may be later recognized and property recorded by the electrical company's third party software 140 (or in other embodiments, e.g., a property management software, rent payment software, etc). Alternatively, such information may be specified in field 514. Of course, the fields and values shown in the illustrated UI 500 are merely exemplary, and any values may be possible in different embodiments.

Embodiments may also exist where the payer does not have to access UI 500 (or similar) to instantiate a payment, and instead, a payment may be initiated by transaction management system 150 on a recurring or preset schedule based on preference or setting information entered by the user via financial service application 211. For instance, in the case of a recurring payment (such as rent), the payer may preset a recurring date/time of payment (e.g., monthly) and payment recipient (e.g., stored contact information for a landlord), and transaction management software 150 may instantiate a new transaction and store the same in database 342 at the scheduled time. In some embodiments, the payer may specify, in the initiation of the payment transaction (step 402), a future date/time at which the payment should be made (also referred to herein as a scheduled payment), such that funds are not withdrawn from the payer's account(s) until the specified date/time.

In the exemplary embodiment of FIG. 5, the payer 110 does not need to enter user/account information specifically to authenticate this transaction. In some embodiments, the payer may also be logged into financial services application 211 or a website via a browser app, and therefore, user input module 331 may obtain information regarding the payer from cached data or session data. This information may be sufficient to identify the information associated with the payer in user profile database 341 (e.g., name and/or account information, account balance, etc.). In some embodiments, user input module 331 may additionally or alternatively collect data about the payer from other information collected from the payer device 112, such as MAC address, IP address, device ID, location information or the like, and may use that information to identify the user profile information (in database 341) associated with the payer and/or authenticate the payer device. In still other embodiments, the user interface 500 may contain one or more fields for user authentication, or may require additional authorization once information has been entered on screen 500, such as password information, biometric information, confirmation of a transmitted code or two-factor authentication, or the like. This additional authorization information may additionally or alternately be used in some embodiments by user input module 331 to identify the appropriate user information and user accounts in database 341.

In response to the payer's instantiation of a payment, in step 404, transaction management system 150 (in some embodiments, link generation module 332) determines whether the payer's account has sufficient funds to cover the payment transaction, that is, whether the balance of the payer's account meets or exceeds the value entered by the payer. In some embodiments, the transaction management system 150 may check only the account specified by the payer (if any) or a default account (e.g., checking account) of the payer, in which case, if the balance falls short of the specified value (NO in step 404), the process proceeds to step 424 and a payment denial is transmit to the payer device 110. The payer may be notified of such denial through a display on their device 110 (step 426), or another message (e.g., text, email, voice call or message, etc.) appropriate.

In some embodiments, rather than a single specified or default account, transaction management system 150 may consider the payer's accounts holistically. For instance, the transaction management system 150 may obtain account information for all accounts belonging to the payer from user profile database 341 and may determine based on the respective balances of those accounts, withdrawal restrictions, and/or user preferences whether or not funds can be withdrawn from a plurality of accounts to fund the payment transaction. In some embodiments, transaction management system 150 may employ one or more machine learning algorithms to determine whether splitting the funding over multiple accounts is recommended or possible, the output of which algorithm(s) is a binary determination of whether sufficient funds are available to the payer at the time the transaction is initiated. In still other embodiments, the payer may have indicated that they wished to make a scheduled payment at a future date, in which case transaction management system 150 may make the determinations of step 404 only at the specified scheduled time rather than at the time the transaction is first input by the payer 110. If the accounts, taken together, are still determined to contain insufficient funds (or insufficient accessible funds), the process proceeds to steps 424 and 426 as described above.

In some embodiments, the transaction management system 150 may not consider withdrawal from a plurality of accounts without approval from the payer, whether set in advance or received at the time of the transaction. For instance, the system 150 may send a notification to the payer device 110 that the specified (or default) account contains insufficient funds and may prompt the user as to whether to access a different account or to cancel the transaction.

If the payer's account(s) contains sufficient funds (YES in step 404), the process proceeds to step 406, in which the amount specified by the user in step 402 is removed from the payer's account(s) and placed in a holding account managed by the transaction management system 150 and/or the consumer banking service 180. The holding account may be thought of an as intermediate account between the payer and the payee. The holding account is used so that the payer cannot double spend the money intended for transmission to the payee. In addition, an entry for the transaction is stored in database 342, based on the information provided in step 402.

In step 408, link generation module 332 generates a hyperlink based on the input information obtained in step 402 and stored in transaction database 342. The generated hyperlink is stored as a new entry in hyperlink database 343. The hyperlink is unique to the transaction, such that a person who follows the hyperlink will arrive at a user interface associated solely with the transaction initiated in step 402, regardless of what if any other transactions the payer 110 may have initiated or the payee 120 may have been sent.

Figure 6A:
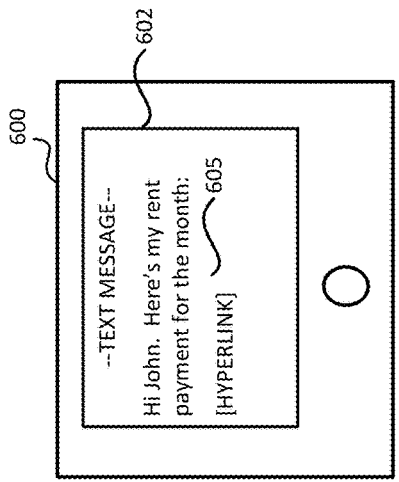
FIGS. 6A and 6B illustrate exemplary messages transmitted to a payee containing a hyperlink, in accordance with some embodiments of the present disclosure.

The hyperlink may be sent to the payee by the transaction management system 150 or by the payer themselves. For instance, the system 150 may transmit to the payer (or the payer may request via application 211), the generated hyperlink. The hyperlink is received by the payer in step 410-*a*, and the payer may then in turn send the hyperlink to the payee in step 410-*b*, for example by copying/pasting the hyperlink into an email or text message between the payer device 110 and the payee device 120. FIG. 6A illustrates an exemplary user interface 600 where a payer has transmitted a text message 602 to a payee (here, "John") containing the hyperlink 605 generated in step 408. The hyperlink may take any format, however in the exemplary embodiment is a clickable or selectable interface (regardless of the text displayed on the payee device 122), which the payee can follow to access one or more UIs. In such an embodiment, the payer doesn't have to enter any contact information for the payee into the transaction processing system 150, or wait for the transaction processing system 150 to issue a formal notification to the payee. Rather, the payer can text or send a message to a payee (e.g., their landlord), from a source known and recognizable to the payee (payer's phone number or email) and at the convenience of both parties. Alternatively, in step 412, the transaction processing system 150 may transmit the hyperlink to the payee device 122 via an electronic message. In some such embodiments, the payer may provide contact information for the payee to the system 150 or such information may already be accessible in a memory.

The message with the hyperlink (whether sent to the payer or payee) may take the form of an email or text message, an SMS (short message service) message, a QR (Quick Response) code, as a notification (e.g., a push notification) or alert to the devices 112 or 122 through one or more apps or operating system messages, e.g., an app-based notification, a phone call, voicemail, a sound or visually-based alert or ping, or any other appropriate means. The message may be, for instance, a human-parseable or understandable message (such as a character string, video, or audio recording) that includes the generated hyperlink and/or details of the transaction.

Figure 6B:
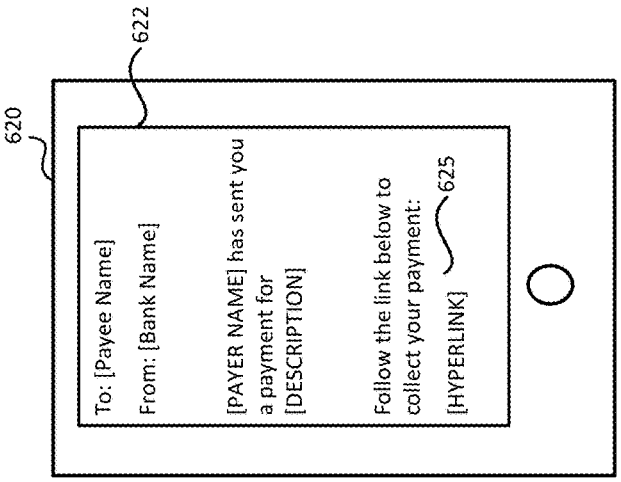

FIG. 6B illustrates an exemplary user interface 620 where system 150 has transmitted a message to payee device 122. In the illustrated embodiment, the message is a text message 622 containing information about the payer name and a description of the transaction, based on the information collected in step 402 and stored in transaction database 342 and/or user profile database 341. The hyperlink 625 is similar to that described above with reference to FIG. 6A. In some embodiments, the text message 622 may identify itself to be from a bank (e.g., consumer banking service 180). Of course, the messages illustrated in FIGS. 6A and 6B are merely exemplary and other embodiments may differ in form or content.

Figure 7:
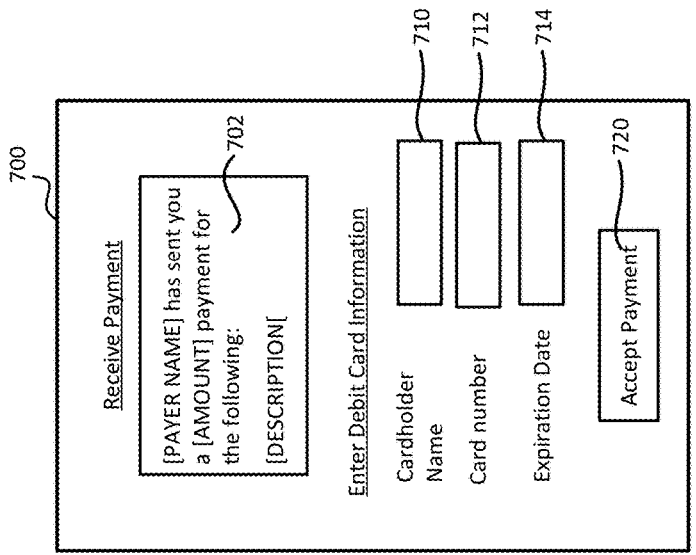
FIG. 7 illustrates an exemplary user interface for a payee to receive a payment transmission, in accordance with some embodiments of the present disclosure.

In step 414, the payee follows the hyperlink in the message using their device 120 by clicking on, touching, tapping, copying/pasting, or otherwise appropriately interacting with the hyperlink. By following the hyperlink, the user input module 331 delivers to the payee device 122 one or more user interfaces, usually via a browser application but in some embodiments via one or more other applications such as a banking application displayed on the device 122, or device-specific applications. The user interfaces contain one or more fields for the payee to enter debit card information (e.g., the 16 digit value), expiration date, etc., or other information (e.g., bank account number, routing number) sufficient to facilitate a credit or payment to the identified debit card/account. In some embodiments, the user interface may also display information describing or relevant to the transaction, such as the payer name, the amount of the transaction, a description (e.g., as entered in element 514 of FIG. 5), or the like. In some embodiments, this information may be displayed to the payee on a screen or user interface separate from and/or preliminary to the user interface through which the payee can enter their debit card information. FIG. 7 illustrates an exemplary user interface 700 for a payee to receive a payment transmission. A payer name and transaction description (optional) is displayed in field 702, and debit card information can be entered in fields 710, 712, and 714. An "Accept Payment" button triggers the transfer of funds from the holding account to the entered destination account (in some embodiments, first requiring a pre-requisite risk analysis and decision and described herein). Of course, the illustration of FIG. 7 is merely exemplary, and the form and content of the UI may vary in other embodiments.

Prior to displaying the user interface(s) to the payee, the user input module 331 may refer to information in the transaction database 342 and/or hyperlink database 342 to determine whether or not the hyperlink for the transaction is still valid and therefore still useable for the payee to complete the transfer of funds. For instance, user input module 331 may refer to state information stored in association with the hyperlink. In one embodiment, the hyperlink is associated with an expiration time, either a date/time at which the link becomes inaccessible (e.g., January $1^{st}$ at 12:00 am), or a "timer" to expiration (e.g., 1 hour, 24 hours, 2 weeks, or any appropriate value). In the case that the expiration is a countdown, a time difference between the date/time the request was initiated by the payer (or alternatively, when the request was processed/approved by the system 150, or when the hyperlink was generated) and the current time the hyperlink is accessed by the payee is calculated, and that time difference is compared to the timer value. If the actual elapsed time exceeds the stored timer value, the hyperlink is considered to have expired, and the payee is instead directed to an error screen, a default screen, an explanatory screen, or the like. In some embodiments, the money transferred from the payer's account to the holding account may be credited back to the payer's account from which it was initially debited at or after the time that the hyperlink has expired. In other embodiments, the "expiration" or the hyperlink may be triggered by a number of visits or hits to the user interface (e.g., website) specified by the hyperlink. For example, a counter value is stored in database 343, and is altered in accordance with the number of times the URL of the hyperlink is used to request data from the web server. In one implementation, the counter begins at zero and is incremented in the memory upon each hit until a maximum or preset number of hits is reached. In another implementation, the counter is initially set to a non-zero value, and is decremented in the memory upon each hit until it reach zero. As one example, the counter may be capped at a value of 1, so that the payee only has one opportunity to obtain the transferred funds.

In Step 414, the recipient uses the user interface to enter their debit card information to receive the transfer. In such an embodiment, no login or signup or download of an app is needed, and no account must be created beyond the financial institution account that the payee is already in possession of. Once that information has been entered, the payee confirms their information (field 720 in FIG. 7) to initiate transfer from the holding account to the payee's account as specified in the user interface 700.

It is possible that the payer may have mis-entered the payee information, or that the payee may be a fraudulent or bad actor. In such scenarios, the transaction management system 150 may wish to avoid finalizing the transfer of funds. Accordingly, in step 416, payment risk module 333 performs a risk analysis to determine a level of risk associated with the transaction. In one embodiment, the risk analysis may be a KYC check (and/or other risk/security checks) on person receiving money. Because the payee does not necessarily go through a formal onboarding process, the KYC check is performed in real-time at the point that credit of the transferred funds is request. The KYC check and/or other risk analyses may be performed in some embodiments via one or more machine learning or other algorithm models using information collected from the payee device such as such as MAC address, IP address, device ID, location information or the like. Payee device 122 may have a location determining module 212 that transferred location information of the payee device to the payment risk module 333. In some embodiments, payment risk module 333 may consider security information from payer device 112 or payee device 122, such as security logs or known flaws or vulnerabilities, virus check results, malware, intrusion attempts, and the like. The risk analysis models implemented by payment risk module 333 may consider, for instance, a payee's IP address, the browser URL string followed, known information about the payee, and the like, to identify a level of risk in the payee. If the risk value exceeds a risk value, the transaction is cancelled (along the lines of step 424). In some embodiments, payment risk module 333 may also consider information in transaction database 342 or user profile database 341, such as whether the payer has made authorized payments to this payee in the past (and the conditions and details of those payments), whether multiple payments have been authorized at once, whether additional payee information is available, and so on. The payment risk module 333 may also access data from third party databases 170 in its analysis, e.g., the reputation of the payee and/or the financial institution associated with the payee's provided debit card information (i.e., who the issuing bank is), previous transaction information or illegal activity associated with the provided debit card (i.e., whether it may be a stolen card), or any other available third-party data.

In step 418, the payment risk module 333, having determined based on its analysis that the risk is sufficiently low (that is, below a threshold), instructs that money be transferred from the holding account (stored in transaction database 342) to the debit card input by the payee in step 414. In the exemplary embodiment, this money transfer is performed through any appropriate real-time mechanism for person-to-person (P2P) or bank-to-bank payments (such as, e.g., Visa Direct or another real-time payments network). The payment transaction between the payer and the payee is thereby concluded, and any relevant information regarding the closed status of the transaction (or other relevant information, such as risk analysis data) may be stored in association with the transaction in transaction database 342.

Transaction management system 150 may send confirmation notifications (e.g., transmission 420) to one or both of payer 110 and payee 120 (step 422). In some embodiments, transaction management system 150 may also, in response to the transmission of funds made to the payee's debit card, trigger a notification to one or more third party payment processing systems. As just one example, a transaction from payer to payee may be a rent payment from a tenant to a landlord, and the third party payment system that might otherwise accept the payer's account information (absent the performance of the process 400 described herein) may be a property management software. This notification is performed after the money has already moved from the payer to the payee; that is, the notification is simply an informative message and/or a request for the third party system to update its own ledgers or records to conform with or otherwise be in line with the payments that have been facilitated. In an exemplary embodiment, the notifications are not targeted communications from a single source to a single destination, but rather, are broadcast communications sent out by the system 150. For instance, system 150 may send out a broadcast stream of transaction information, each broadcast communication being automatically triggered by the credit of a desired amount of money to a payee account. This process might involve, for instance, the generation of serialized data representative of the information regarding the transaction (such as any of information sufficient to identify a payer and/or a payee, an account number, a payment amount, etc.), or from which such information may be derived. The broadcast communication may be made on a transmission to each of the plurality of webhook URLs, or an HTTP command (e.g., HTTP GET request) containing the generated serialized data, though it is not so limited.

In one example implementation, the system 150 establishes, at a point in time in advance of step 430, one or more webhook interfaces with different third party payment processing systems, such as property management software, and the like. The contact information and/or webhook information for these system may be stored in some embodiments in third party payment system database 344, with each of a plurality of webhook URLs being respectively associated with each of the plurality of remote servers/systems specified in the database 344. These third party systems may be include, for instance, the most common or most well-known/widely-used systems, may include systems relevant or specific to a transaction type or category, may be specified by the payer 110, and/or may be otherwise collected or selected in any appropriate way. The payer is assumed to use one of the pieces of third party software; if the payer does not use one of the payment process software configured to listen to the broadcast message, the transaction itself is unimpacted (as it is already complete). However, embodiments may be possible where one or both of the payer and payee have not performed any sort of preauthorization/pre-signup/pre-configuration with a third party payment processing systems, at least of the type of payment processed in steps 402-422.

In step 432, the third party property management system 140 monitors the public stream of payments transmitted by the transaction management system 150 in step 430. When the third party property management system 140 finds a "match" (that is, a conformance) between the information specified in a broadcast communication and one or more of their internal property management records (step 434) the system 140 may record the transaction. For instance, they may add a record of the transaction to their internally stored ledger(s), which may take the form of a table, database, or other appropriate data storage (step 436). In some embodiments, they could notify transaction management system 150 and/or consumer banking service 180 that they have updated their records (not specifically shown).

Conventionally, a customer must log into a plurality of different third party payment processing systems (e.g., property management systems, utilities payment systems), and enter their own debit card number into each disparate system in order to pay the multiple bills they are obligated to pay. This exposes the customer's payment information to unknown parties across potentially insecure interfaces rather than trusted entities. However, the systems and methods described above with reference to FIGS. 1-7 allow a banking system to provide to its user in real-time unique payment mechanisms facilitating payment directly between a payer's and a payee's devices, without the need for any intermediate payment systems. The conventional system is thereby inverted; in the systems described herein, the payee may collect via their debit card rather than the payer entering their debit card to send money. When a payee launches a website using the hyperlink sent to them, they do not have to log into or sign up with any third party systems or download any apps to their device. The banking system may additionally, through continuous notifications to third party payment systems, send instructions such that the ledgers of the third party payment systems align with the directly facilitated payments. The systems and methods described herein provide several technical advantages and benefits over conventional solutions. Unlike conventional "recommendations" made by human tellers or advisors at banks, a human does not need to intercede or make any deliberated decision for a payment to be processed. Further, the payer and payee need not subscribe to the same service or system, allowing electronic payments to be transmitted and received without the creation of new or multiple accounts, allowing for faster and more robust transactions. Further, because fewer computers systems are involved, the overall technical environment is simplified, such that data transmission and/or security can be better managed. Further still, because text or email or other messaging may be used from an entity known to the payee (the payer), both parties can feel confident in the source of the transaction, even where the payee is unfamiliar with the payer's bank.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A transaction management system for managing direct payer to payee payment transactions without need for any intermediate payment systems, the transaction management system comprising:
   a server having an electronic communications interface capable of receiving data from a payer computing device and a payee computing device via a digital communications network, wherein the server is associated with and is in electronic communication with a single trusted consumer banking service computing device associated with a consumer banking service where a user associated with the payer computing device holds a first financial account;
   wherein a dedicated application is installed on the payer computing device and the payee computing device and the dedicated application is configured to generate one or more user interfaces on each of the payer computing device and the payee computing device which allows for input of payment and account information;
   wherein the payer computing device interacts electronically with the server and the single trusted consumer banking service computing device, and wherein the payee computing device interacts electronically with the server but need not be associated with the single trusted consumer banking service computing device, wherein the payee computing device is associated with a gayer third party account associated with a third party payment processing system for processing payments received by the payee computing device;
   the server, comprising a memory configured to store instructions; and
   at least one processor configured to execute the stored instructions to perform steps comprising:
      receiving, by the server and from the payer computing device, an electronic payment transaction comprising a monetary value for the electronic payment transaction;
      identifying, by the server and based on receiving the electronic payment transaction, the first financial account from which to debit the monetary value for the electronic payment transaction;
      determining, by the server, whether the first financial account has sufficient funds from which to debit the monetary value for the electronic payment transaction;
      based on determining that the first financial account has sufficient funds from which to debit the monetary value for the electronic payment transaction, debiting the first financial account of the monetary value;
      crediting, by the server, a holding account established at the server separate from the first financial account with the monetary value for the electronic payment transaction;
      associating, within the memory, the electronic payment transaction with information associated with the first financial account, the monetary value, the holding account, and at least one state value, wherein the at least one state value is representative of a state of the electronic payment transaction;
      generating, by the server, a unique hyperlink associated with the electronic payment transaction, wherein the unique hyperlink is associated solely with the electronic payment transaction;
      storing, in the memory, in association with the electronic payment transaction, a hyperlink value representative of the unique hyperlink;
      transmitting, by the server, the unique hyperlink to the payer computing device;
      transmitting, by the payer computing device, the unique hyperlink to the payee computing device, by copying and pasting the unique hyperlink into a communications interface on the payer computing device, wherein following the unique hyperlink on the payee computing device will cause an application executing on the payee computing device to generate the one or more user interfaces associated with the electronic payment transaction;
      receiving, from a web server and in response to the payee computing device accessing the unique hyperlink, a request to deliver the one or more user interfaces associated with the electronic payment transaction to the payee computing device;
      determining, by the server, whether to deliver the one or more user interfaces associated with the electronic payment transaction to the payee computing device based on the at least one state value stored in the memory, wherein the at least one state value determines whether the unique hyperlink is valid or expired;
      based on determining to deliver the one or more user interfaces associated with the electronic payment transaction to the payee computing device, delivering, by the server, the one or more user interfaces associated with the electronic payment transaction to the payee computing device;

receiving, from the one or more user interfaces on the payee computing device, debit card information associated with a second financial account associated with the payee computing device, wherein the debit card information is received directly from the one or more user interfaces and without a requirement to create an account;

based on receiving the debit card information, performing a risk analysis that calculates a level of risk associated with the electronic payment transaction;

transmitting, by the server and based on determining that the level of risk associated with the electronic payment transaction meets a threshold level, a debit instruction to the holding account, and a credit instruction to a second financial institution associated with the payee computing device to post a credit to the second financial account; and transmitting, by the server, to a plurality of third party payment processing systems associated with a plurality of payees, via a webhook URL/API electronic communication, payment transaction data between a plurality of payers and a plurality of payees, wherein the payer third party account with the third party payment processing system is automatically updated.

2. The transaction management system of claim 1, wherein transmitting the unique hyperlink to the payee computing device comprises:

generating a human-readable message comprising the unique hyperlink; and transmitting the human-readable message to the payee computing device.

3. The transaction management system of claim 2, wherein the human-readable message containing the unique hyperlink comprises one or more of: a text message, an email, a push notification, an SMS message, or a QR code.

4. The transaction management system of claim 1, wherein the at least one processor is further configured to execute the stored instructions to perform steps comprising sending, based on transmitting the credit instruction to the second financial institution, a notification of the electronic payment transaction to a plurality of remote servers.

5. The transaction management system of claim 1, wherein the at least one processor is further configured to execute the stored instructions to perform steps comprising:

determining that the electronic payment transaction comprises a scheduled payment time; and identifying, based on receiving the electronic payment transaction, the first financial account at or after the scheduled payment time.

6. The transaction management system of claim 1, wherein the information associated with the first financial account specifies at least one additional financial account associated with the payer computing device.

7. The transaction management system of claim 6, wherein determining whether the first financial account associated with the payer computing device has sufficient funds from which to debit the monetary value for the electronic payment transaction comprises:

determining that the first financial account does not have sufficient funds from which to debit the monetary value for the electronic payment transaction; and based on determining that the first financial account does not have sufficient funds from which to debit the monetary value for the electronic payment transaction, applying a machine-learning algorithm to identify that a combination of funds from the first financial account and funds from the at least one additional financial account is sufficient from which to debit the monetary value for the electronic payment transaction.

8. The transaction management system of claim 7, wherein the at least one processor is further configured to debit the first financial account of the monetary value by:

debiting a first portion of the monetary value for the electronic payment transaction from the first financial account; and debiting a remaining portion of the monetary value for the electronic payment transaction from the at least one additional financial account, wherein a sum of the first portion of the monetary value and the remaining portion of the monetary value is equal to the monetary value for the electronic payment transaction.

9. The transaction management system of claim 4, wherein sending, based on transmitting the credit instruction to the second financial institution, a notification to a plurality of remote servers by:

identifying a plurality of webhook URLs, each of which is respectively associated with one of the plurality of remote servers;

generating serialized data representative of the information regarding the electronic payment transaction; and sending, to each of the plurality of webhook URLs, an HTTP command containing the serialized data.

10. The transaction management system of claim 1, wherein the risk analysis is a know your client (KYC) check.

11. A transaction management method for managing direct payer to payee payment transactions without need for any intermediate payment systems, wherein a server having an electronic communications interface capable of receiving data from a payer computing device and a payee computing device via a digital communications network, wherein the server is associated with and is in electronic communication with a single trusted consumer banking service computing device associated with a consumer banking service where a user associated with the payer computing device holds a first financial account:

wherein a dedicated application is installed on the payer computing device and the payee computing device and the dedicated application is configured to generate one or more user interfaces on each of the payer computing device and the payee computing device which allow for input of payment and account information;

wherein the payer computing device interacts electronically with the server and the single trusted consumer banking service computing device, and wherein the payee computing device interacts electronically with the server but need not be associated with the single trusted consumer banking service computing device, wherein the payee computing device is associated with a gayer third party account associated with a third party payment processing system for processing payments received by the payee computing device, comprising:

receiving, by the server anti from a payer computing device, an electronic payment transaction comprising a monetary value for the electronic payment transaction;

identifying, by the server and based on receiving the electronic payment transaction, the first financial account from which to debit the monetary value for the electronic payment transaction;

determining, by the server, whether the first financial account has sufficient funds from which to debit the monetary value for the electronic payment transaction;

based on determining that the first financial account has sufficient funds from which to debit the monetary value for the electronic payment transaction, debiting the first financial account of the monetary value for the electronic payment transaction;

crediting, by the server, a holding account established at the server separate from the first financial account with the monetary value for the electronic payment transaction;

associating, within memory, the electronic payment transaction with information associated with the first financial account, the monetary value, and at least one state value, wherein the at least one state value is representative of a state of the electronic payment transaction;

generating, by the server, a unique hyperlink associated with the electronic payment transaction, wherein the unique hyperlink is associated solely with the electronic payment transaction;

storing, in memory, in association with the electronic payment transaction, a hyperlink value representative of the unique hyperlink;

transmitting, by the server, the unique hyperlink to the payer computing device;

transmitting, the payer computing device, the unique hyperlink to a payee computing device by copying and pasting the unique hyperlink into a communications interface on the payer computing device, wherein following the unique hyperlink on the payee computing device will cause an application executing on the payee computing device to generate the one or more user interfaces associated with the electronic payment transaction;

receiving, from a web server and in response to the payee computing device accessing the unique hyperlink, a request to deliver the one or more user interfaces associated with the electronic payment transaction to the payee computing device;

determining, by the server, whether to deliver the one or more user interfaces associated with the electronic payment transaction to the payee computing device based on the at least one state value stored in the memory, wherein the at least one state value determines whether the unique hyperlink is valid or expired;

based on determining to deliver the one or more user interfaces associated with the electronic payment transaction to the payee computing device, delivering, by the server, the one or more user interfaces associated with the electronic payment transaction to the payee computing device;

receiving, from the one or more user interfaces on the payee computing device, debit card information associated with a second financial account associated with the payee computing device, wherein the debit card information is received directly from the one or more user interfaces and without a requirement to create an account;

based on receiving the debit card information, performing a risk analysis that calculates a level of risk associated with the electronic payment transaction;

transmitting, by the server and based on determining that the level of risk meets a threshold level, a debit instruction to the holding account, and a credit instruction to a second financial institution associated with the payee computing device to post a credit to the second financial account; and transmitting, by the server, to a plurality of third party payment processing systems associated with a plurality of payees, via a webhook URL/API electronic communication, payment transaction data between a plurality of payers and a plurality of payees, wherein the payer third party account with the third party payment processing system is automatically updated.

12. The transaction management method of claim 11, wherein transmitting the unique hyperlink to the payee computing device comprises:
generating a human-readable text message comprising the unique hyperlink; and
transmitting the human-readable text message to the payee computing device.

13. The transaction management method of claim 11, further comprising sending, by the server and based on transmitting the credit instruction to the second financial institution, a notification of the electronic payment transaction to a plurality of remote servers.

14. The transaction management method of claim 11, further comprising:
sending, by the server and based on determining that credit was posted to the second financial account, a notification to the payer computing device that credit was posted to the second financial account.

15. The transaction management method of claim 11, wherein the information associated with the first financial account specifies at least one additional financial account associated with the payer computing device.

16. The transaction management method of claim 15 further comprising:
determining that the first financial account does not have sufficient funds from which to debit the monetary value for the electronic payment transaction; and
based on determining that the first financial account does not have sufficient funds from which to debit the monetary value for the electronic payment transaction, applying a machine learning algorithm to identify that a combination of funds from the first financial account and funds from the at least one additional financial account is sufficient from which to debit the monetary value for the electronic payment transaction.

17. The transaction management method of claim 15, further comprising debiting the first financial account of the monetary value by:
debiting a first portion of the monetary value for the electronic payment transaction from the first financial account; and
debiting a remaining portion of the monetary value for the electronic payment transaction from the at least one additional financial account, wherein a sum of the first portion of the monetary value and the remaining portion of the monetary value is equal to the monetary value for the electronic payment transaction.

18. The transaction management method of claim 13, wherein sending the notification of the electronic payment transaction comprises:
identifying a plurality of webhook URLs, each of which is respectively associated with one of the plurality of remote servers;
generating serialized data representative of the information regarding the electronic payment transaction; and
transmitting, to each of the plurality of webhook URLs, an HTTP command containing the serialized data.

19. The transaction management method of claim 13, wherein sending the notification of the electronic payment transaction is based on the monetary value of the electronic payment transaction.

20. The transaction management method of claim 11, wherein the risk analysis is a know your client (KYC) check.

* * * * *